Patented May 25, 1937

2,081,766

UNITED STATES PATENT OFFICE 2,081,766

THIOETHERS AND THEIR PRODUCTION

Walter Reppe and Fritz Nicolai, Ludwigshafen-on-the-Rhine, Germany, assignors to I. G. Farbenindustrie Aktiengesellschaft, Frankfort-on-the-Main, Germany No Drawing. Application September 18, 1934, Serial No. 744,534. In Germany September 23, 1933

12 Claims. (Cl. 260—150)

The present invention relates to the manufacture of thioethers.

We have found that thioethers, more particularly thiovinyl ethers and ethane dithiol ethers (corresponding to the general formula $$RSCH=CH_2 \text{ or } RSCH_2CH_2SR,$$

respectively, in which R stands for an aliphatic, isocyclic or heterocyclic radicle) can be obtained in a simple manner and in good yields by causing acetylene to act on a mercaptan at a temperature of between 50° and 300° C., preferably between about 100° and 200° C. and in the presence of catalysts. Suitable mercaptans are: methyl mercaptan, ethyl mercaptan, butyl mercaptan, hexyl mercaptan, dodecyl mercaptan and octodecyl mercaptan, thiophenol, thiocresol, thionaphthol, benzyl mercaptan, 2-mercaptobenzothiazole, polyvalent mercaptans, as for example ethylene-di-mercaptan (ethane dithiol) or thioresorcinol.

The reaction may be carried out both in the liquid phase, if desired in the presence of solvents, in particular alcohols, and in the gaseous phase; according to the initial materials employed and the other reaction conditions, either atmospheric or elevated pressure is employed. The acetylene may be diluted with inert gases, as for example with nitrogen, hydrogen or methane, if desired.

As catalysts may be mentioned especially basic metal compounds, as for example the oxides, hydroxides, sulfides, acetates, phenolates, alcoholates, mercaptides and silicates of the alkali metals and of the alkaline earth metals, and furthermore the salts of zinc and cadmium with organic acids, if desired with an addition of mercury compounds, as for example the formate, acetate, stearate, benzoate, phthalate of zinc or cadmium, and mixtures of these substances. The catalysts may be employed as such in a solid or dissolved or suspended form or precipitated on carrier substances, such as active carbon, kieselguhr or pumice stone.

The process may be carried out continuously or discontinuously.

For example the mercaptan to be reacted with acetylene may be heated in a pressure-tight container in the presence of the catalyst with a mixture of acetylene and a diluent gas, such as nitrogen, until the absorption of acetylene commences, acetylene being then pressed in until no further acetylene is absorbed.

When working continuously it is preferable to employ a pressure-tight pipe system. Into one end of this the mercaptan to be converted is continuously led in a liquid state, the reaction product being continuously withdrawn from the other end. The acetylene, either alone or in admixture with a diluent gas, is led in a cycle through the pipe system by means of a compressor and a circulating pump either in the same direction or in the counter current.

In cases when they are gaseous or readily vaporizable, the mercaptans may be led in admixture with acetylene, if desired under pressure, through a reaction tower filled with a liquid of high boiling point which does not take part in the reaction, as for example polyalkylene glycols, such as di- and triethylene glycol, which contains the catalyst in the dissolved or suspended state.

The course of the reaction is influenced in particular by the nature of the catalyst selected as may be seen from the following statements:

When employing a basic metal compound, as for example potassium hydroxide, the acetylene most frequently enters the SH-group of the mercaptan employed so that the corresponding thiovinyl ether of the general formula $RSCH=CH_2$ is formed.

In the presence of the zinc and cadmium salts, as for example zinc or cadmium acetate, the thiovinyl ether is also first formed, but in this case a further molecule of the initial material readily adds on to the thiovinyl ether so that the main reaction product are ethers of ethane dithiole of the general formula $RSCH_2CH_2SR$, formed according to the equation:

$$RSCH=CH_2+RSH \rightarrow RSCH_2CH_2SR$$

Thus, thiophenol, when reacted with acetylene in the presence of potassium hydroxide as catalyst, yields the thiophenol vinyl ether in a practically quantitative amount. If zinc acetate be employed as catalyst, for example, instead of potassium hydroxide, the other conditions being substantially the same, as the main product, the ethane dithiol diphenyl ether $$C_6H_5SCH_2CH_2SC_6H_5$$

is obtained, besides a small amount of thiophenol vinyl ether.

Also when employing basic metal compounds as catalysts, by suitably selecting the other reaction conditions (pressure, temperature, and amount of acetylene employed) the thiovinyl ether first formed may be caused to add on a further molecule of initial material thus producing ethane dithiol ether. This may take place, especially when the amount of acetylene employed is not sufficient to completely convert the mercaptan employed into the monovinyl thioether.

The following examples will further illustrate the nature of this invention, but the invention is not restricted to these examples. The parts are by weight.

*Example 1*

A mixture of nitrogen and acetylene in the ratio by volume of 1:2 is pressed into a stirring autoclave containing a mixture of 190 parts of thiophenol, 200 parts of butanol and 6 parts of caustic potash, until the pressure amounts to about 15 atmospheres. The autoclave is heated, while stirring, to 160° C., acetylene being pressed in until no further absorption takes place, which is the case after heating for about 12 hours. By working up the reaction product, 215 parts of thiophenol vinyl ether ($C_6H_5SCH=CH_2$), a yield equal to 91.7 per cent of the theoretical yield, are obtained. The butanol is scarcely changed by the presence of the thio compound and may be employed again.

From 400 parts of para-thiocresol, under the same conditions, 430 parts of para-thiocresol vinyl ether ($H_3CC_6H_4SCH=CH_2$) having a boiling point of from 98° to 100° C. at 14 millimeters pressure (mercury gauge) are obtained, coming up to 89 per cent of the theoretical yield. In the same manner the beta-thionaphtholvinyl ether, having a boiling point of from 125° to 130° C. at a pressure of 14 millimeters (mercury gauge) is obtained from beta-thionaphthol.

From 2-mercaptobenzothiazole the 2-mercaptobenzothiazole vinyl ether, having a boiling point of from 135° to 140° C. at 3 to 2 millimeters pressure (mercury gauge) is obtained in an analogous manner.

*Example 2*

By causing the mixture of acetylene and nitrogen under substantially the same conditions as in Example 1, to act on thiophenol in which 3 per cent by weight of zinc acetate are dissolved, and heating the whole for 20 hours at 160° C. a reaction product is obtained which consists of a mixture of 25 per cent of thiophenol vinyl ether and 75 per cent of ethane dithiol diphenyl ether ($C_6H_5SCH_2CH_2SC_6H_5$), the latter of which compounds has a melting point of 70° C.

Under the same conditions para-thiocresol yields a mixture of para-thiocresol vinyl ether and ethane dithiol di-para-tolyl ether

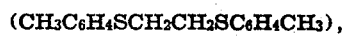
($CH_3C_6H_4SCH_2CH_2SC_6H_4CH_3$), the latter having a boiling point of from 185° to 196° C. at from 3 to 4 millimeters pressure (mercury gauge) and a melting point of 81° C.

*Example 3*

A mixture of nitrogen and acetylene in the ratio of 1:2 by volume is pressed into a stirring autoclave containing 400 parts of ethyl mercaptan in which 4 parts of sodium are dissolved, until the pressure amounts to 10 atmospheres. The autoclave is heated to from 150° to 160° C., the pressure first increasing and then slowly falling at the rate at which the acetylene is absorbed. When the pressure has become constant, the whole is cooled to room temperature and acetylene is pressed in and the heating, cooling and pressing in of acetylene are repeated until saturation is reached.

By working up the reaction product, a quantitative yield (calculated on the ethyl mercaptan employed) of a mixture in the ratio of 2:3 by weight of thiovinyl ethyl ether ($C_2H_5SCH=CH_2$) having a boiling point of 91° C. and ethane dithiol diethyl ether ($C_2H_5SCH_2CH_2SC_2H_5$) having a boiling point of from 90° to 95° C. at 24 millimeters pressure (mercury gauge) is obtained.

*Example 4*

By leading through a solution of 30 grams of zinc acetate in 1000 grams of para-thiocresol contained in a vertical iron container of 1 m. of length and 5 cm. of internal diameter, heated by the electric current, acetylene in a cycle at a rate of 30 liters per hour at a temperature of from 130° to 140° C. under atmospheric pressure, 87 liters of acetylene are absorbed in the course of 8 hours. By working up the reaction product 165 grams of para-thiocresol vinyl ether and 760 grams of ethane dithiol di-para-tolyl ether are obtained.

*Example 5*

Into the reaction vessel described in Example 4 a solution of 100 grams of potassium sulfide in 2000 grams of diethylene glycol is filled in. Through the solution 168 grams of ethyl mercaptan vapor and 56 liters of acetylene are led per hour at a temperature of from 140° to 150° C. The vapors escaping from the reaction vessel are led through a well cooled receiver in which a mixture consisting of about equal parts by weight of thiovinyl ethyl ether and of unchanged ethyl mercaptan are separated off.

*Example 6*

500 parts of 1 - mercapto - 2,5 - dimethyl - 4 - chlorobenzene are mixed with 1000 parts of butanol and 15 parts of solid potassium hydroxide. Then butanol is distilled off until the distillate no longer contains water. The mixture is then introduced into a stirring autoclave and a mixture of nitrogen and acetylene in the ratio by volume of 1:2 is pressed in until the pressure amounts to about 15 atmospheres. The autoclave is heated to from 150° to 160° C., while stirring, and pressing in acetylene is continued until the pressure no longer decreases, which is the case after about 12 hours. When subjecting the reaction product to a fractional distillation, the thiovinyl ether having the formula—

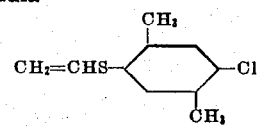

which is formed in a good yield, exceeding 90% of the theoretical amount, distils over at a temperature of from 110° to 112° C. at a pressure of from 4 to 5 millimeters (mercury gauge).

*Example 7*

50 parts of benzyl mercaptan are mixed with 100 parts of butanol which contain 2 parts of potassium hydroxide. Then 50 parts of butanol are distilled off in order to remove the water. The mixture is then introduced into a stirring autoclave and a mixture of nitrogen and acetylene in the ratio by volume of 1:2 is pressed in until the pressure amounts to about 15 atmospheres. The autoclave is heated to from about 130° to 140° C., while stirring, and pressing in acetylene is continued until no further absorption can be observed, which is the case after about 6 hours. After cooling, the reaction mixture is distilled under reduced pressure. The thiovinyl benzyl ether, having the formula

$C_6H_5CH_2SCH=CH_2$ distils over at a temperature of 73° C. at a pressure of 3 millimeters (mercury gauge). It is a water clear liquid. The yield is 86 per cent of the theoretical amount.

If instead of benzyl mercaptan 50 parts of dodecyl mercaptan are employed under the same reaction conditions thiovinyl dodecyl ether is obtained in an amount of 88 per cent of the theoretical value. The new ether is a water clear liquid boiling at from 129° to 130° C. at a pressure of 3 millimeters (mercury gauge).

*Example 8*

500 parts of 8-chlorothionaphthol are mixed with 1250 parts of butanol and 15 parts of solid potassium hydroxide. Then the butanol is distilled off until the distillate no longer contains water. After replenishing the portion of butanol distilled off by fresh anhydrous butanol the mixture is treated with a mixture of acetylene and nitrogen in the ratio by volume of 2:1 in an autoclave in the manner described in the preceding example. By subjecting the reaction product to a fractional distillation, the 8-chlorothionaphthol vinyl ether formed in a good yield is obtained. It boils at a temperature of from 154° to 155° C. at a pressure of from 3 to 2 millimeters (mercury gauge).

What we claim is:

1. The process of producing thioethers which comprises acting on a mercaptan with acetylene at a temperature of between 50° and 300° C. in the presence of a compound of a metal of the first and second groups of the periodic system selected from the group consisting of basic metal compounds and salts of zinc and cadmium with an organic acid.

2. The process of producing thioethers which comprises acting on a mercaptan with acetylene at a temperature of between 100° and 200° C. in the presence of a compound of a metal of the first and second groups of the periodic system selected from the group consisting of basic metal compounds and salts of zinc and cadmium with an organic acid.

3. The process of producing thioethers which comprises acting on a mercaptan with a mixture of an inert diluent gas and acetylene at a temperature of between 50° and 300° C. in the presence of a compound of a metal of the first and second groups of the periodic system selected from the group consisting of basic metal compounds and salts of zinc and cadmium with an organic acid.

4. The process of producing thioethers which comprises acting on a mercaptan at a temperature between the boiling point of said mercaptan and 300° C. with acetylene at a temperature of between 50° and 300° C. in the presence of a compound of a metal of the first and second groups of the periodic system selected from the group consisting of basic metal compounds and salts of zinc and cadmium with an organic acid.

5. The process of producing thioethers which comprises acting on a mercaptan in the liquid phase with acetylene at a temperature of between 50° and 300° C. in the presence of a compound of a metal of the first and second groups of the periodic system selected from the group consisting of basic metal compounds and salts of zinc and cadmium with an organic acid.

6. The process of producing thioethers which comprises acting on a mercaptan under a pressure sufficiently high to maintain the said mercaptan in the liquid phase with acetylene at a temperature of between 50° and 300° C. in the presence of a compound of a metal of the first and second groups of the periodic system selected from the group consisting of basic metal compounds and salts of zinc and cadmium with an organic acid.

7. The process of producing thioethers which comprises acting on a mercaptan in the liquid phase with acetylene at a temperature of between 50° and 300° C. in the presence of a compound of a metal of the first and second groups of the periodic system selected from the group consisting of basic metal compounds and salts of zinc and cadmium with an organic acid, until no further acetylene is absorbed.

8. The process of producing thioethers which comprises acting on a mercaptan in the presence of a solvent for said mercaptan with acetylene at a temperature of between 50° and 300° C. in the presence of a compound of a metal of the first and second groups of the periodic system selected from the group consisting of basic metal compounds and salts of zinc and cadmium with an organic acid.

9. The process of producing thioethers which comprises pressing acetylene into a solution of a mercaptan in an alcoholic solvent under a pressure sufficiently high to maintain the said solution in the liquid phase at a temperature between 50° and 300° C. in the presence of a compound of a metal of the first and second groups of the periodic system selected from the group consisting of basic metal compounds and salts of zinc and cadmium with an organic acid.

10. The process of producing thioethers which comprises leading a mixture of a vaporized mercaptan and acetylene at a temperature between the boiling point of said mercaptan and 300° C. through a high boiling liquid inert to acetylene under the reaction conditions and containing a compound of a metal of the first and second groups of the periodic system selected from the group consisting of basic metal compounds and salts of zinc and cadmium with an organic acid.

11. The process of producing thioethers which comprises leading a mixture of a vaporized mercaptan and acetylene at a temperature between the boiling point of said mercaptan and 300° C. through a polyethylene glycol containing a compound of a metal of the first and second groups of the periodic system selected from the group consisting of basic metal compounds and salts of zinc and cadmium with an organic acid.

12. 8-chlorothionaphthol vinyl ether.

WALTER REPPE.
FRITZ NICOLAI.